US006445587B1

(12) United States Patent
Pavol

(10) Patent No.: US 6,445,587 B1
(45) Date of Patent: Sep. 3, 2002

(54) DISK DRIVE VIBRATION/SHOCK ATTENUATION SYSTEM AND METHOD

(75) Inventor: Eric Grant Pavol, Louisville, CO (US)

(73) Assignee: Storage Technology Corporation, Louisville, CO (US)

( * ) Notice: Subject to any disclaimer, the term of this patent is extended or adjusted under 35 U.S.C. 154(b) by 1 day.

(21) Appl. No.: 09/661,240

(22) Filed: Sep. 13, 2000

(51) Int. Cl.[7] ................................................ G06F 1/06
(52) U.S. Cl. ........................ 361/727; 761/684; 761/685; 761/686
(58) Field of Search .......................... 361/679, 683–686, 361/724–729; 248/560, 603, 644, 610–615, 632–636

(56) References Cited

U.S. PATENT DOCUMENTS 6,084,768 A * 7/2000 Bolognia ..................... 361/685

OTHER PUBLICATIONS

"Hard Drive Dampers" by Heathcote Industrial Plastics LTD,; www. heathcoats.com,, 1 page.
"Noise Dampers" by Heathcote Industrial Plastics LTD,; www.heathcoats.com,, 1 page.

* cited by examiner

Primary Examiner—Darren Schuberg
Assistant Examiner—Yean-Hsi Chang
(74) Attorney, Agent, or Firm—Brooks & Kushman P.C.

(57) ABSTRACT

A mechanism and a method for damping shocks and vibrations between a drive tray and one or more media drives mounted within the drive tray are disclosed. The mechanism comprises one or more resilent layers disposed between the drive tray's housing and a drive module adapted to hold the media drive. Preferably, at least two of the resilient layers e positioned on opposite sides of the drive module to hold the drive module while avoiding a hard contact with the drive tray. A plurality of cover layers adjoin the plurality of resilient layers respectively. One or more plates having a resonant frequency outside an adverse frequency range for the media drive may be position within the drive module to engage the media drive. In operation, the plates convert internally and externally generated vibrations into a resonant vibration having a resonant frequency to which the media drive is relatively insensitive. Friction between the plates and shells that form the drive module's housing dissipate a portion of the resonant vibration as heat. The resonant vibration and any externally induced shock and vibrations are further dampened by the resilient layers.

27 Claims, 4 Drawing Sheets

DISK DRIVE VIBRATION/SHOCK ATTENUATION SYSTEM AND METHOD

TECHNICAL FIELD

The present invention is related to the field of shock and vibration attenuation for media drives.

BACKGROUND ART

High performance disk drives are finely tuned electro-mechanical devices. The precision necessary to allow these devices to work is proportional to their capacity to hold customer data and their ability to handle the data in volume. Disk drive performance is dependent on the vendor's drive design that includes the servo algorithms, spindle and disk pack balancing, internal damping and dynamic characteristics. Disk drive performance is also influenced by the environment in which it must operate.

In a quest for ever-shrinking cost per megabyte of storage, the track density, or tracks per inch (TPI) have increased. The TPI trend, along with efforts to reduce packing costs and unit footprints, has led to significant challenges regarding disk drive implementation. Obstacles presented to the industry consist of damping and attenuating the disk drive's own internally generated vibrations, isolating the disk drive from vibrations created by neighboring disk drives, and isolating the disk drive from externally generated shocks and vibrations.

A poorly implemented disk drive mounting solution may cause various problems at a higher system level. An unconstrained, vibrating disk drive will tend to knock itself off track while performing a read or write seek. If the drive cannot successfully find the correct location to read or write on the disk surface, the disk drive must wait until the disk pack rotates around to the same location to attempt the operation again. The extra rotation results in a write or read inhibit that is treated as an error. These errors can affect the input/output speed of the individual disk drive and the system as a whole. If the problem is severe enough, the disk drive will be turned off or fenced due to its inability to read and write data. It is possible that the disk drive will be fenced due a system level mounting problem and not due to a problem with the disk drive itself. Corrective maintenance for shock and vibration induced errors will usually result in the replacement of a healthy disk drive.

Several approaches have been used in attempts to minimize the effects of self-induced vibrations, and externally induced shocks and vibrations on various disk drives. Many of these same approaches are also used with other moving-media type drives such as optical dives, magneto-optical drives, and tape drives, generically referred to as media drives.

A common shock and vibration damping approach is to attach each media drive to a system level drive tray through one or more springs. Springs provide a degree of mechanical isolation between neighboring media drives mounted in the drive tray, as well as isolation from externally induced shocks and vibrations. Springs, however, allow vibrational energy to remain in the media drive thus adding to the energy spectrum of the media drive environment. Springs also contact the media drive chassis in only a few specific locations that are selected based upon a center of mass and not based upon closeness to the vibration sources.

Resonant plates have also been incorporated in damping systems to control the frequency of vibrations present in the media drive's chassis. The plates have a resonant frequency at which the media drive is relatively immune to vibration induced errors. Most of the vibrational energy present in the media drive's chassis is converted to the resonant frequency by the plates. Plates by themselves, however, do not dissipate the vibrational energy. All of the energy that enters the plates eventually returns to the media drive chassis or is transferred away through the springs.

The present invention provides an improved damping mechanism and method of operation that addresses the limitations discussed above.

DISCLOSURE OF INVENTION

The present invention is a system for housing a media drive, a drive tray for housing the media drive, and a method of operation to attenuate shocks and vibrations for the media drive. The system includes a drive tray housing and one or more drive modules, each adapted to hold one media drive. One or more resilient layers are disposed between the drive tray housing and each drive module to attenuate shocks and vibrations for that drive module. In a preferred embodiment, at least two of the resilient layers are positioned on opposite sides of each drive module to prevent the drive modules from making hard contact with the drive tray housing. Each resilient layer has an associated cover layer that supports sliding of the drive modules with respect to the drive tray housing for insertion and removal purposes.

In the preferred embodiment, the resilient layers and cover layers are mounted inside one or more bays defined in the drive tray housing. Each bay being adapted to receive one drive module. In an alternative embodiment, the resilient layers and cover layers are attached to the individual drive modules.

Each drive module may contain one or more plates that engage the enclosed media drive. Each plate has a resonant frequency that is outside an adverse frequency range for the media drive. The plates convert vibrations entering or exiting the media drive into a resonant vibration at the resonant frequency of the plate.

One or more of the resilient layers may have a viscoelastic property for converting shocks and vibrations into heat. An adhesion layer may be placed between the resilient layers and the respective cover layers so that the cover layers constrain the adjoining surface of the resilient layers.

Accordingly, it is the object of the present invention to provide an improved mechanism and method of operation for attenuating shocks and vibrations for a media drive.

These and other objects, features, and advantages will be readily apparent upon consideration of the following detailed description in conjunction with the accompanying drawings.

BEST MODE FOR CARRYING OUT THE INVENTION

Figure 1:
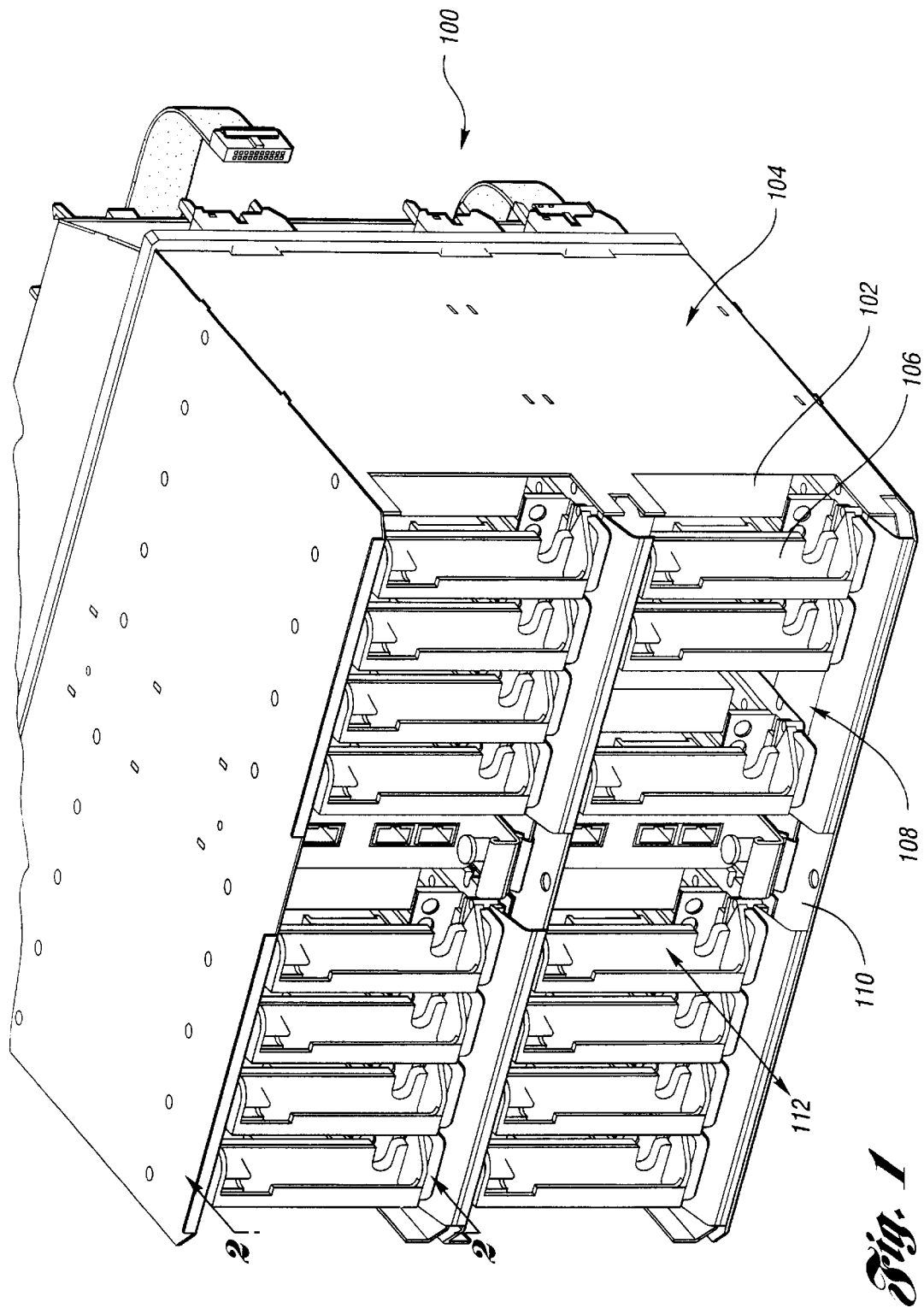
FIG. 1 is a perspective view of an example system implementing the present invention.

An example system 100 that implements the present invention for multiple media drives 102 is shown in FIG. 1. The system includes a drive tray 104 adapted to hold one or more drive modules 106. Each drive module can be inserted into, and removed from, a bay 108 in a drive tray housing 110. The bays 108 may be arranged in one dimension, two dimensions (as shown in FIG. 1), or in three-dimensional arrays. Multiple drive trays 104 may be stacked together to form larger systems 100 as required. In the preferred embodiment, the bays 108 are oriented to allow the drive modules 106 to be inserted and removed along a horizontal path, as shown by line 112. This preferred orientation is both convenient for a user of the system 100 and it helps keep the bays 108 free from dust and debris that may fall from above. Other orientations and insertion/removal paths may be used to meet space claim requirements for the drive tray 104 and user access requirements for the drive modules 106.

Figure 2:
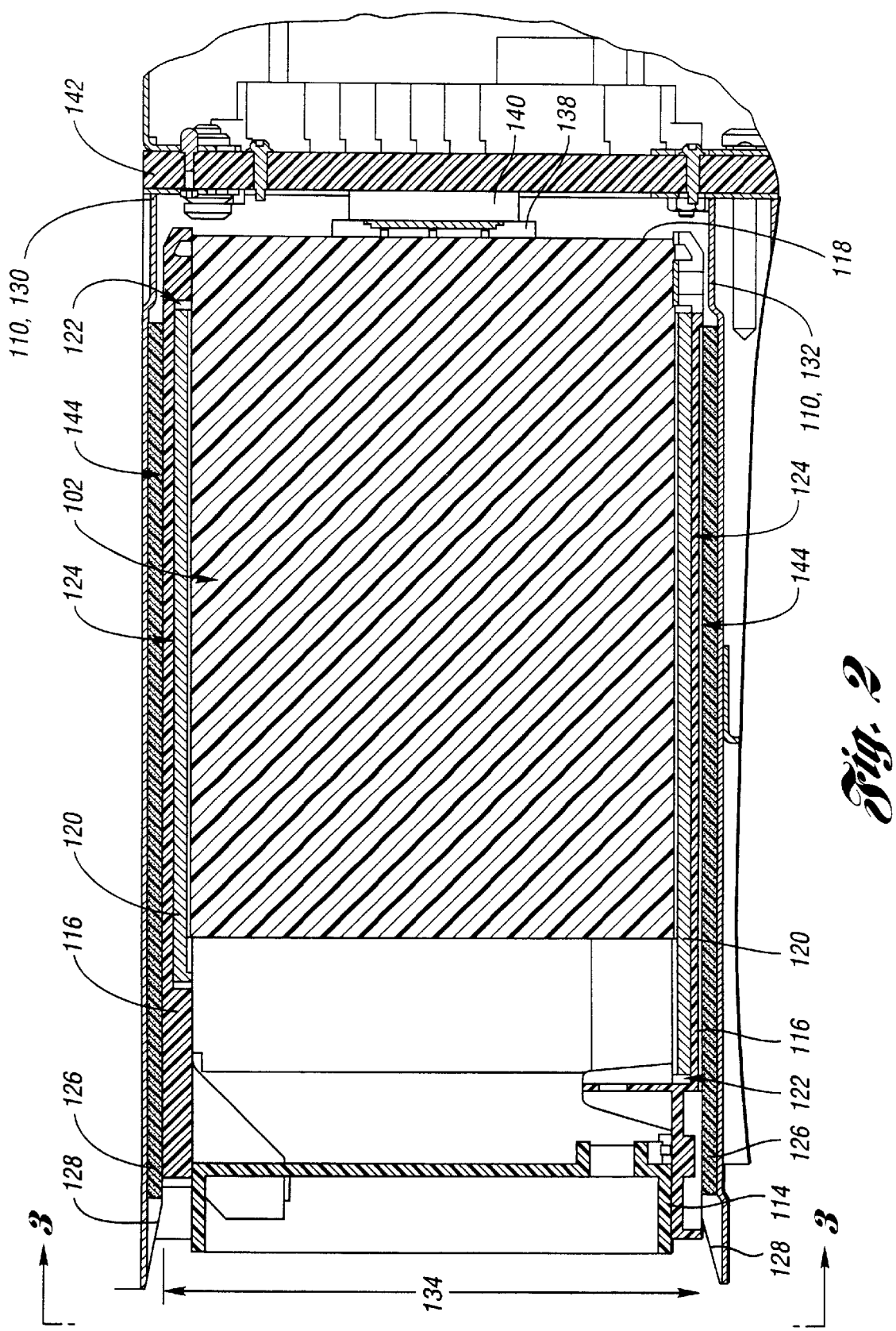
FIG. 2 is a cross-sectional view taken along a vertical center plane through a bay in the system, a drive module residing in the bay, and a media drive mounted in the drive module.

FIG. 2 is a cross-sectional view along a vertical center line through one of the drive modules 106 inserted into the drive tray 104. The drive module 106 includes, but is not limited to a handle 114 and two shells 116 that surround one of the media drives 102. In the preferred embodiment, the media drive 102 is a hard magnetic disk drive, although other types of drives may be enclosed by the drive module 106. Preferably, the two shells 116 are made of an electrically insulating material. This allows a media drive chassis 118 to be electrically isolated from the drive tray housing 110 and other media drives 102 if so required by the grounding scheme for the system 100. An example of a suitable material for the two shells 116 is LEXAN®500, available from the General Electric Company, Pittsfield, Mass. LEXAN®500 is a polycarbonate having good electrical insulating, mechanical and chemical characteristics over a wide range of environmental conditions. In alternative embodiments, the two shells 116 may be made of other materials, including electrically conductive materials, that meet or exceed operating and storage requirements for the drive module 106. For example, the two shells 116 may be made of a conductive material such as aluminum when the media drive chassis 118 is constructed from or coated with a nonconductive material. In another example, it may be desirable to fabricate the two shells 116 from a conductive material. This will help establish a grounding path between the media drive chassis 118 to the drive tray housing 110 through the drive module 106 and other conductive layers.

One or more plates 120 may be included in the drive module 106. Plates 120 are typically, although not necessarily, made from steel and are firmly attached to the media drive chassis 118 to establish good mechanical coupling. Each plate 120 also fits snugly into a cavity 122 formed in the two shells 116. In the preferred embodiment, the plates 120 engage the shells 116 from inside the cavities 122. No adhesive material is used at interfaces 124 between the plates 120 and the shells 116. This approach allows the plates 120 and shells 116 to rub ever so slightly against each other thereby generating heat from the resulting friction or shearing. Consequently, a portion of the vibrational energy traversing across the interfaces 124 from the shells 116 to the plates 120, or from the plates 120 to the shells 116 is converted into heat energy and ultimately dissipated.

Each plate 120 is designed to have a resonant frequency chosen to be outside an adverse frequency range for the media drive 102. The adverse frequency range is a band of frequencies to which the media drive 102 is sensitive to vibrations. This sensitivity is commonly associated with the head servos in disk-type media drives. Sufficiently large shock impulses and vibrations around natural resonant frequencies in the head servos can knock the head servos off track thus causing read and write errors. It does not matter if these shocks and vibrations are generated externally and feed into the media drive 102, or are generated internal to the media drive 102 by the spinning disks and seeking drive servo. The plates 120 are operative to convert shock and vibration energy that they may encounter into resonant vibrations at the predetermined resonant frequency. Each plate may have the same resonant frequency or a different resonant frequency. Here, any resonant vibration energy transferred from the plates 120 to the media drive chassis 118 will be at a frequency that has minimal impact on the media drive operations. An example plate 120 may be a steel plate 0.150 inches thick and having its first resonant frequency at 1600 Hz. This resonant frequency is well above a 30–800 Hz adverse frequency range for a typical disk drive.

Foam laminates are disposed between the drive module 106 and the drive tray housing 110. Each foam laminate includes, but is not limited to a resilient layer 126 adjoining a cover layer 128. In the preferred embodiment, one foam laminate is positioned between the top of the drive module 106 and a top shelf 130 of the drive tray housing 110. A second foam laminate is positioned between the bottom of the drive module 106 and a bottom shelf 132 of the drive tray housing 110. Each resilient layer 126 is attached to the respective top and bottom shelves 130 and 132 with an adhesive. Cover layers 128 are positioned between the resilient layers 126 and the drive module 106. A height of a bay opening, as indicated by dimension 134, is designed to be slightly less than the height of the drive module 106. Consequently, the resilient layer 126 are compressed when the drive module 106 is installed in the bay 108.

By using foam laminates above and below the drive modules 106, individual media drives 102 are isolated from their neighbor's vibration energy. This creates an optimum situation by in effect allowing each media drive 102 to have its own system unperturbed by the neighboring media drives 102. Two foam laminates provide improved shock protection when compared with a single foam laminate because of the increased effective thickness, and a lack of a hard surface to impact. Two foam laminates also provide improved shock and vibration damping as compared with one foam laminate or a couple of springs. A large surface area of the drive module 106 engages the two foam laminates creating short paths between sources of vibrations internal to the media drive 102 and the resilient layers 126 of the foam laminates.

Resilient layers 126 provide several beneficial properties to the system operation. Resilient layers 126 provide the shock and vibration dampening for the drive module 106. In very simple terms, resilient layers 126 can be thought of as spring/dampers with the drive module 106 behaving as a vibrating mass. Material type, density, stiffness, thickness, and compression of the resilient layers 126 can be optimized to minimize the motion of the drive module 106 in a frequency range of interest, and in particular, in the adverse frequency range.

A resilient layer 126 positioned along the bottom shelf 132 provides vertical support and vertical positioning for the drive module 106. Vertical support is important for avoiding hard contact between the drive module 106 and the drive tray housing 110 where shocks and vibrations could be transferred undamped. Generally, no resilient layer 126 is positioned along the back side of the bay 108 to accommodate electrical connectors and air flow for fans that may be located along the back of the media drive 102. An additional resilient layer 126 could be located along the back of the bay 108 in alternative embodiments.

Figure 3:
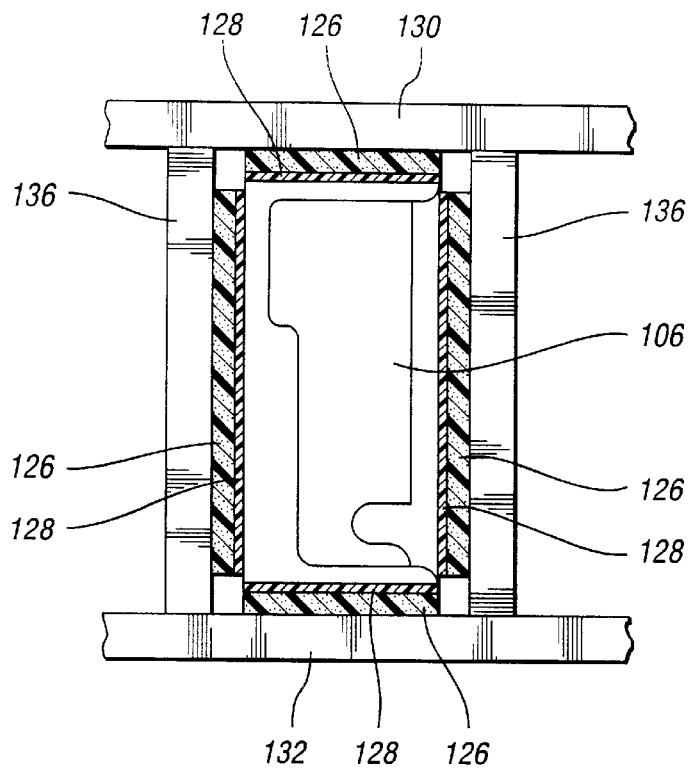
FIG. 3 is side view looking at a drive module installed in a bay.

Referring to FIG. 3, resilient layers 126 may also be positioned horizontally along opposing sidewalls 136 of the bay 108 in alternative embodiments. Here, these resilient layers 126 provide horizontal positioning of the drive module 106 as well as additional shock and vibration damping. Horizontal and vertical positioning is beneficial when attempting to mate a connector 138 (see FIG. 2) of the media drive 102 with a socket 140 attached to a motherboard 142. Other configurations (e.g. horizontally sloped) and shapes (e.g. curved) of the resilient layers 126 may be employed to accommodate other mounting configurations and drive module shapes.

Another benefit of resilient layers 126 is that they engage (through the cover layers 128) a large surface area of the media drive chassis 118. Ideally, resilient layers 126 cover 100% of the drive module's top and bottom surface areas (and side surface areas in the alternative embodiments). In practical applications, resilient layers 126 may cover less than 100% of any given surface area of the drive module 106 for cost or space claim reasons. For example, the resilient layer 126 above the drive module 106 may cover only 50% of the drive module's top surface area to avoid appendages (not shown) that create a non-planar surface. If necessary, the multiple resilient layers 126 may be used along one surface to avoid interferences on the drive module 106. Coverage as low as approximately 2% on any given surface may be employed within the scope of the present invention.

A suitable material for the resilient layers 126 is PORON® silicone foam BF-1000, available from Rogers Corporation of Elk Grove Village, Ill. PORON® BF-1000 silicone foam remains resilient over a wide range of environmental extremes, has good physical, electrical and environmental properties for common disk drive applications, and has a low creep characteristic that provide for a long life span. A thickness of approximately ⅛ inch or greater provides suitable shock and vibration damping in practical applications. Greater thicknesses are preferred. Narrower thicknesses are possible to meet tight space constraints.

PORON® silicone foam has a silicone component that improves its energy-absorbing characteristics as compared with regular foam. Other types of materials, such as viscoelastic dampening materials may be used for the resilient layers 126. Viscoelastic materials attached to the drive tray housing 110 form free-layer dampers that convert shock energy and vibration energy into heat. Using a rigid material for the cover layers 128, and attaching the cover layers 128 to the resilient layers 126 with adhesive layers 144 (see FIG. 2) create constrained layer dampers. Constrained layer dampers have greater shock and vibration absorbing capacity than free-layer dampers. Note that each of the resilient layers may be made from the same material or from different materials. For example, one or more resilient layers may be made from silicon foam while at the same time one or more other resilient layers may be made of another material having a viscoelastic characteristic.

Another function of the cover layers 128 is to provide a tough, friction reducing barrier between the resilient layers 126 and the drive modules 106. LEXAN® FR700 polycarbonate, in sheet form, is one example of a suitable material for forming the cover layers 128. LEXAN® FR700 is available from the General Electric Company, Pittsfield, Mass. Polycarbonate type cover layers 128 will slide against polycarbonate type shells 122 of the drive module 106 with acceptable levels of friction when the drive module 106 is inserted or removed from the bay 108. Cover layers 128 also provide protection for the resilient layers 126 by preventing gouging and tearing by the drive modules 106 or any other object inserted into the bay 108.

Figure 4:
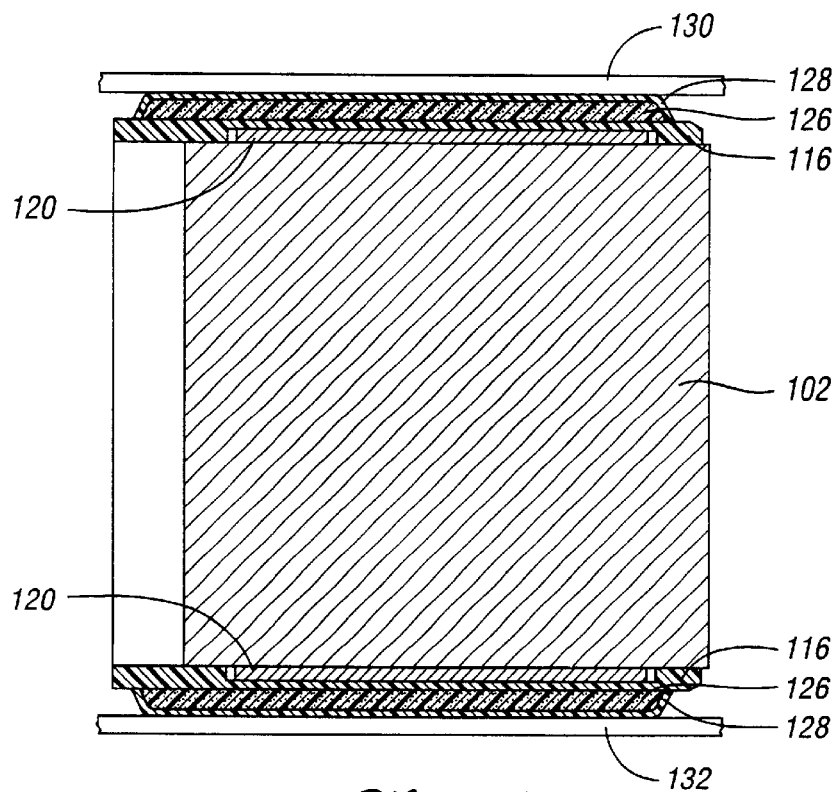
FIG. 4 is a cross-sectional view of a second embodiment.

FIG. 4 shows an alternative embodiment of the present invention. Here, the foam laminates form part of the drive module 106. Each of the resilient layers 126 is attached to the shells 116 one side, and to the cover layers 128 on the other side. The cover layers 128 may engage the top shelf 130 and bottom shelf 132 of the drive tray housing 110 directly. In an alternative embodiment, additional polycarbonate layers (not shown) or equivalent layers may be attached to the top shelf 130 and bottom shelf 132 to create a low-friction interface with cover layers 128. In this embodiment, the back end of the foam laminates are beveled to facilitate insertion of the drive module 106 between the top and bottom shelves 130 and 132.

Figure 5:
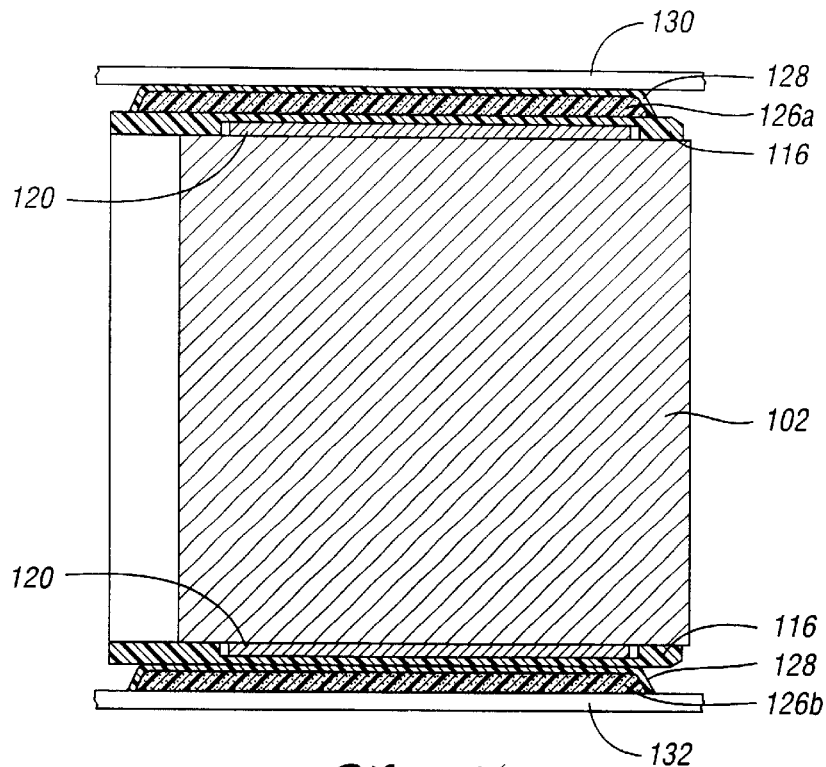
FIG. 5 is a cross-sectional view of a third embodiment.

FIG. 5 shows yet another embodiment of the present invention. In this embodiment, attachment of the foam laminates is divided between the drive module 106 and the drive tray 104. Here, the top resilient layer 126*a* is attached directly to the shells 116 and becomes part of the drive module 106. In contrast, the bottom resilient layer 126*b* is attached to the bottom shelf 132 and becomes a part of the drive tray 104. Clearly the associations may be reversed with the top resilient layer 126*a* being attached to the top shelf 130 and the bottom resilient layer 126*b* being attached to the shells 116. Likewise, side resilient layers (not shown) may be fabricated as part of the drive module 106 or part of the drive tray 104.

Figure 6:
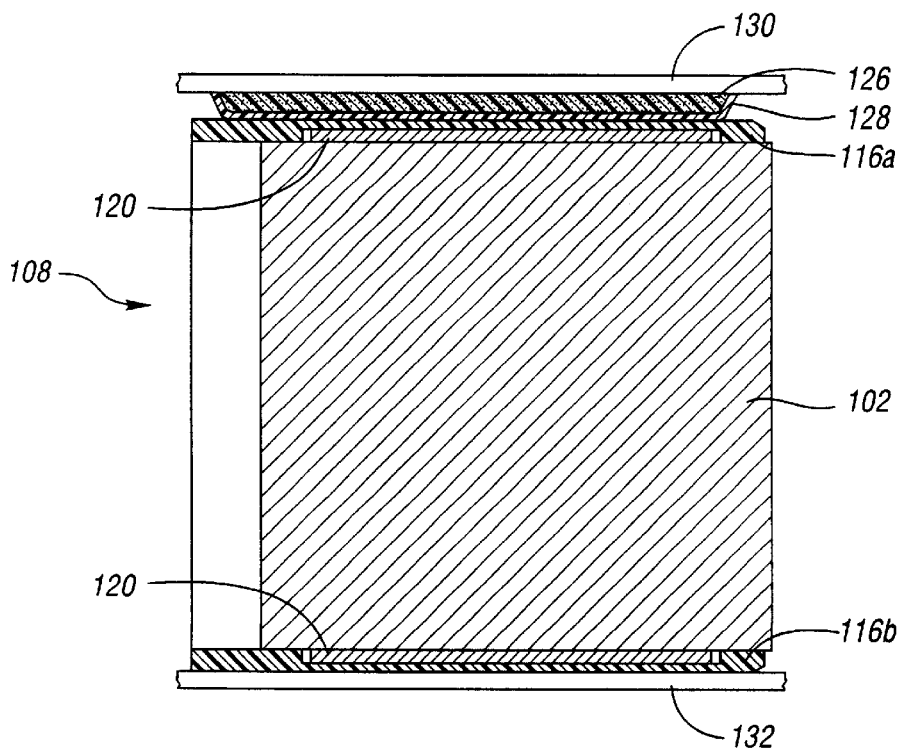
FIG. 6 is a cross-sectional view of a fourth embodiment.

FIG. 6 shows an alternative embodiment where only one resilient layer 126 and one cover layer 128 are employed. Bottom shell 116*b* rests against the bottom shelf 132. Top shell 116*a* engages the cover layer 128 and resilient layer 126 attached to the top shelf 130. In this case, cover layer 126 should be of a flexible material to allow the drive module 106 smooth transitions into and out of the bay 108. Alternatively, the cover layer 128 and resilient layer 126 may be positioned below or to one side of the drive module 106. When cover layer 128 and resilient layer 126 are positioned below the drive module 106, then an air gap (not shown) or a retaining spring (not shown) may be used between the top shell 116*a* and the top shelf 130 to avoid a hard contact between the drive module 106 and the top shelf 130.

Another variation shown in FIG. 6 is that the cover layer 128 and the resilient layer 126 engage less than the entire top surface area of the top shell 116*a*. The surface area of a drive module side engaged by cover sheet 128 and resilient layer 126 may be anywhere from 100 percent to approximately 20 percent within the scope of the present invention. Engaging less than approximately 10 percent of any one drive module side causes the resilient layer 128 to start behaving as a spring with a highly localized point of contact at the shell 116. Preferably, the cover layer 128 and resilient layer 126 span no less than 40 percent of any drive module surface that they engage, or on which they are mounted. It is also possible to use multiple sets of cover layers 128 and resilient layers 126 on one side of the drive module 106. For example, two 40 percent coverage sets of cover layers 128 and resilient modules 126 may be used between the bottom shell 116*b* and the bottom shelf 132 while a single 60 percent coverage cover sheet 128 and resilient layer 126 is used between the top shell 116*a* and the top shelf 130.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system for mounting a media drive, the system comprising:
   a housing;
   a module adapted to hold the media drive and to be inserted into and removed from the housing, the module including a first plate positioned to engage the media drive, the first plate having a first resonant frequency that is outside an adverse frequency range for the media drive;
   a plurality of resilient layers disposed between the housing and the module to attenuate shocks and vibrations, at least two of the plurality of resilient layers being positioned on opposing sides of the module; and
   a plurality of cover layers, each one of the plurality of cover layers adjoining one of the plurality of resilient layers respectively to facilitate sliding of the module with respect to the housing during insertion of the module into the housing and removal of the module from the housing.

2. The system of claim 1 where one of the plurality of resilient layers is positioned below the module to provide vertical support to the module.

3. The system of claim 1 where each of the plurality of resilient layers is attached to a surface selected from the housing and the module, and at least one of the plurality of resilient layers has a viscoelastic property for converting shocks and vibrations into heat.

4. The system of claim 3 further comprising a plurality of adhesion layers, each one of the plurality of adhesion layers connecting one of the plurality of cover layers to one of the plurality of resilient layers respectively so that the plurality of cover layers constrain the plurality of resilient layers.

5. The system of claim 1 further comprising a second plate disposed in the module and positioned to engage the media drive, the second plate being positioned on an opposite side of the media drive as the first plate, and the second plate having a second resonant frequency that is outside the adverse frequency range for the media drive.

6. The system of claim 1 further comprising an interface formed where the module engages the first plate, the interface being operative to partially convert vibrations crossing the interface into heat.

7. The system of claim 1 wherein one of the plurality of resilient layers is positioned below the module, and another of the plurality of resilient layers is positioned above the module.

8. The system of claim 1 wherein one of the plurality of resilient layers is attached to a bottom surface of the module, and another of the plurality of resilient layers is attached to a top surface of the module.

9. The system of claim 1 wherein at least one of the plurality of resilient layers is a silicone foam layer.

10. The system of claim 1 wherein at least one of the plurality of cover layers is a polycarbonate sheet.

11. A tray for housing a module, the tray comprising:
    a housing having a bay adapted for receiving the module;
    a plurality of resilient layers, each of the plurality of resilient layers being attached to one of a plurality of surfaces inside the bay respectively to attenuate shocks and vibrations, at least two of the plurality of resilient layers being positioned on opposing surfaces of the plurality of surfaces; and
    a plurality of cover layers, each one of the plurality of cover layers adjoining one of the plurality of resilient layers respectively to facilitate sliding of the module with respect to the tray during insertion of the module into the bay and removal of the module from the bay.

12. The tray of claim 11 where one of the plurality of resilient layers is positioned on a bottom surface of the plurality of surfaces of the bay to provide vertical support to the module.

13. The tray of claim 12 wherein another of the plurality of resilient layers is positioned on a top surface of the plurality of surfaces of the bay.

14. The tray of claim 11 where at least one of the plurality of resilient layers has a viscoelastic property for converting shocks and vibrations into heat.

15. The tray of claim 14 further comprising a plurality of adhesion layers, each one of the plurality of adhesion layers connecting one of the plurality of cover layers to one of the plurality of resilient layers respectively so that the plurality of cover layers constrain the plurality of resilient layers.

16. The tray of claim 11 where the plurality of resilient layers are a plurality of silicon foam layers.

17. The tray of claim 11 where the plurality of cover layers are a plurality of polycarbonate sheets.

18. The tray of claim 11 wherein the cover layers are configured to slidingly engage the module to facilitate sliding of the module with respect to the tray during insertion of the module into the bay and removal of the module from the bay.

19. The tray of claim 11 wherein each cover layer is attached to a respective resilient layer.

20. A method for attenuating shocks and vibrations between a media drive and a tray, the method comprising:
    converting the vibrations into a resonant vibration at a resonant frequency in a plate engaging the media drive, the resonant frequency being outside an adverse frequency range for the media drive; and
    damping the resonant vibration and the shocks in a plurality of resilient layers disposed between the tray and the media drive, at least two of the plurality of resilient layers being positioned on opposing sides of the media drive.

21. The method of claim 20 further comprising converting the resonant vibration into heat in an interface between the plate and a shell adjoining the plate.

22. The method of claim 21 wherein damping the resonant vibration and the shocks includes converting the resonant vibration and the shocks into heat through a viscoelastic property in at least one of the plurality of resilient layers.

23. The method of claim 22 further comprising constraining opposing surfaces of the plurality of resilient layers to support conversion of the resonant vibration and the shocks into heat.

24. A system for mounting a media drive, the system comprising:
    a housing;
    a module adapted to hold the media drive and to be inserted into and removed from the housing;
    a resilient layer disposed between the housing and one side of the module to attenuate shocks and vibrations; and a cover layer adjoining the resilient layer to facilitate sliding of the module with respect to the housing during insertion of the module into the housing and removal of the module from the housing, the cover layer being flexible and spanning at least 20 percent of the one side of the module.

25. The system of claim 24 further comprising a plate disposed in the module and positioned to engage the media drive, the plate having a resonant frequency that is outside and adverse frequency range for the media drive.

26. The system of claim 25 further comprising an interface formed where the module engages the plate, the interface being operative to partially convert vibrations crossing the interface into heat.

27. A system for mounting a media drive, the system comprising:

a housing;

a module adapted to hold the media drive and to be inserted into and removed from the housing, the module including a first plate positioned to engage the media drive, the first plate having a first resonant frequency that is outside an adverse frequency range for the media drive; and a resilient layer disposed between the housing and the module to attenuate shocks and vibrations.

* * * * *